United States Patent [19]

Babos

[11] 4,431,395

[45] Feb. 14, 1984

[54] GINGERBREAD HOUSE APPARATUS

[76] Inventor: George B. Babos, 264 Azure Rd., Venice, Fla. 33595

[21] Appl. No.: 137,598

[22] Filed: Apr. 7, 1980

[51] Int. Cl.³ ............................................. A21C 11/10
[52] U.S. Cl. .................................... 425/298; 249/133; 249/142; 249/161; 249/DIG. 1; 426/104; D7/43
[58] Field of Search ................. 249/DIG. 1, 133, 142, 249/161; 426/104; D7/43; 425/298

[56] References Cited

U.S. PATENT DOCUMENTS

| | | | |
|---|---|---|---|
| 986,286 | 3/1911 | Hartmann | 426/104 |
| 2,182,215 | 12/1939 | Stainbrook | 249/DIG. 1 |
| 2,775,523 | 12/1956 | Green | 426/104 |
| 2,876,714 | 3/1959 | Brown | 425/298 |

FOREIGN PATENT DOCUMENTS 2703900  8/1978  Fed. Rep. of Germany ...... 426/104

*Primary Examiner*—James H. Derrington

*Attorney, Agent, or Firm*—Paul H. Gallagher

[57] ABSTRACT

A group of molds, or baking tins, for placement of dough therein and in which the dough is baked. Each mold includes a bottom element surrounded by an upturned rim. The dough thus baked, in each mold, forms a rigid panel, and those panels are fitted together to form a gingerbread house, the molds including one for each of the walls, and the roof. The panels are fitted together and secured by placing icing in the junctures between the panels. The apparatus also includes a plurality of inserts or cookie cutters that are pressed into the fresh dough when it is put in the molds, and each cuts and isolates a piece of the dough from the main mass, that piece also being baked, and after the dough is baked, the inserts are removed, and the pieces are also removed, either by adhering to the inserts and being lifted out, or by being knocked out. This leaves openings in the panels which form windows and doors, and the pieces, or knockouts, are used to form a chimney to the house.

3 Claims, 13 Drawing Figures

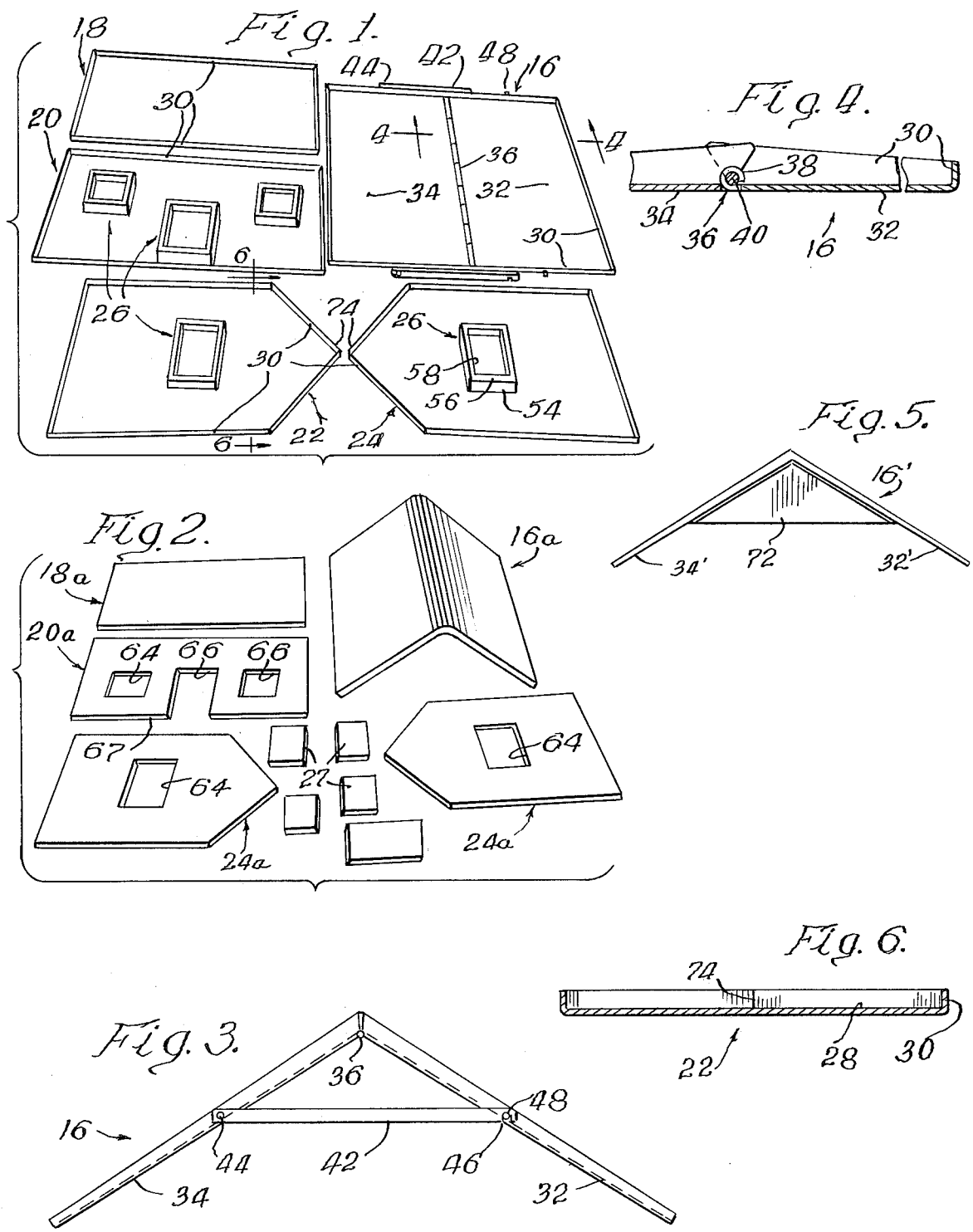

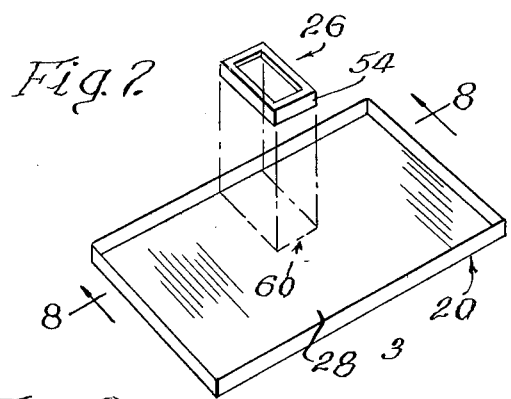
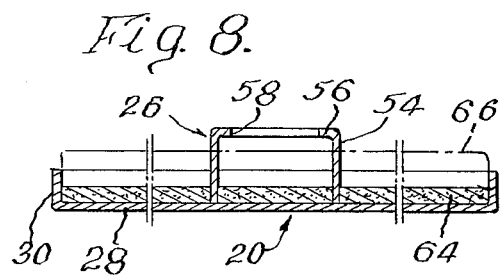
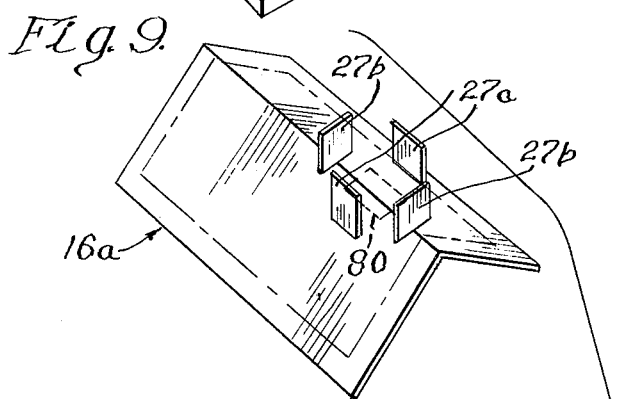
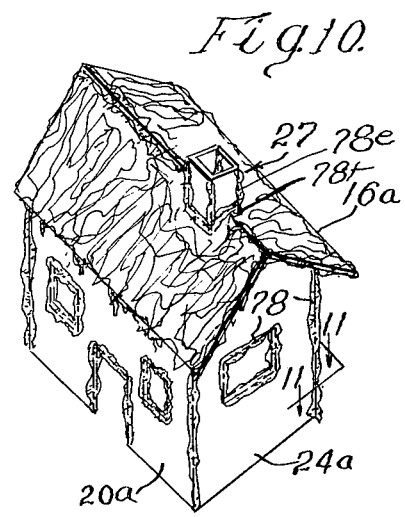
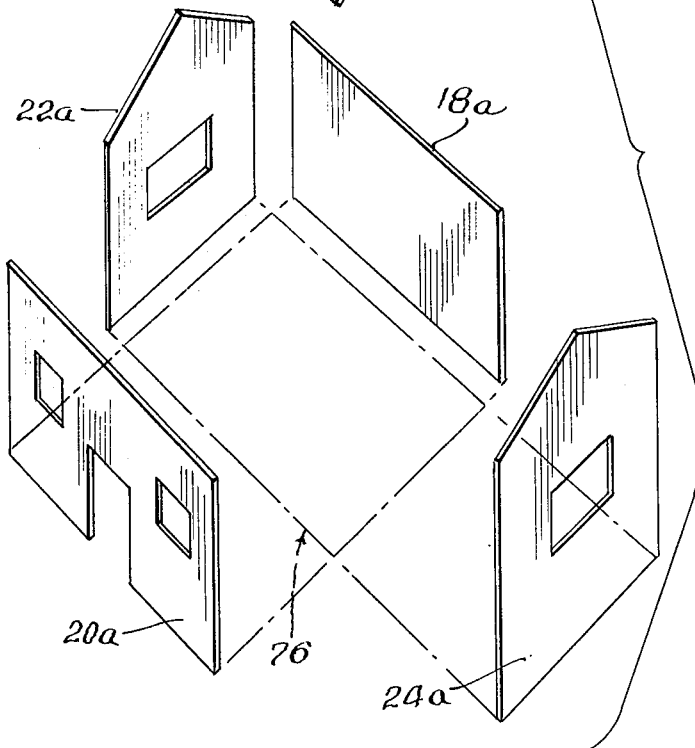
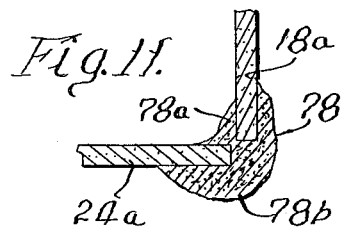
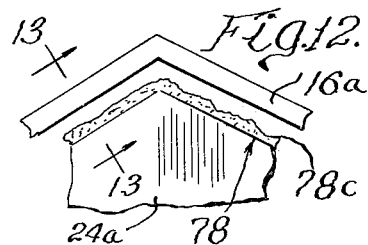
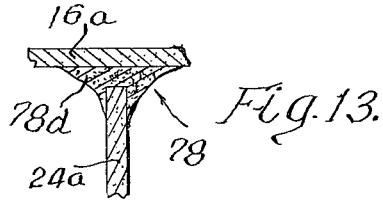

fig
GINGERBREAD HOUSE APPARATUS

BACKGROND OF THE INVENTION

A gingerbread house is generally understood to mean a house in the nature of a toy, and edible, whether actually made of gingerbread or not. The example utilized herein includes such a house made of gingerbread, but the invention is sufficiently broad to include a house made of any edible material.

OBJECTS OF THE INVENTION

The main object of the invention is to provide a gingerbread house and apparatus and method for making it, having the novel characteristics:

(a) The apparatus is specially designed and effective for home use.
(b) The apparatus is simple to use by an amateur, such as a home cook.
(c) The apparatus is very inexpensive to manufacture.
(d) The apparatus is adapted to a wide variety of shapes, in the manufacture thereof, whereby to produce a corresponding wide variety in design in the resulting gingerbread houses.
(e) The method is very simple and easy to carry out.
(f) The product, the gingerbread house itself, is extremely attractive in appearance.

DESCRIPTION OF A PREFERRED EMBODIMENT

In the drawings:

FIG. 1 is a perspective view of the molds or cake tins of the invention, laid out in a spread;

FIG. 2 is a perspective view of the panels of baked dough, removed from the molds of FIG. 1, constituting the pieces to be built into the house, laid out in a spread;

FIG. 3 is an end view of the mold, of FIG. 1, for forming the roof;

FIG. 4 is a sectional view taken at line 4—4 of the roof mold of FIG. 1;

FIG. 5 is an end view of a modified form of mold for forming the roof;

FIG. 6 is a sectional view taken at line 6—6 of FIG. 1;

FIG. 7 is a perspective view of one of the molds and an insert associated therewith;

FIG. 8 is a sectional view oriented according to line 8—8 of FIG. 7, but with dough in the mold and the insert fitted down in the mold, and pressed into the dough;

FIG. 9 is an exploded view of separate pieces making up the gingerbread house, in spaced relation and indicating how they are to be fitted together;

FIG. 10 is a perspective view of the finished gingerbread house;

FIG. 11 is a sectional view taken at line 11—11 of FIG. 10;

FIG. 12 is a fragmentary view of the end wall panel and roof panel indicating a step in fitting them together; and FIG. 13 is a sectional view taken at line 13—13 of FIG. 12, but with the panels fitted together.

Referring in detail to the drawings, FIG. 1 shows a spread or group of molds, which are similar to cake tins, for molding and baking dough panels constituting the pieces or parts making up the gingerbread house. These molds include a roof mold 16, two side wall molds 18, 20 and two end wall molds 22, 24.

Also appearing in FIG. 1 are a plurality of inserts 26 all basically similar, but which may be of different sizes and shapes. These inserts may also be referred to as cookie cutters, for forming openings in the wall panels, the knockouts from these openings being also used in the construction of the chimney of the house.

All of the molds are basically similar in that each includes a bottom element 28 and an upturned rim 30 completely surrounding the bottom element. Dough is placed in the molds, filling them to the top of the surrounding rim, and the molds are then placed in the oven and baked. Thereafter the baked dough is removed from the molds, forming panels for placement together to construct the gingerbread house. These panels become rigid by the baking thereof, and are self-supporting when placed upright, and the roof panel placed atop the walls. The wall panels and roof panel together may also be referred to as bounding members of the completed house.

The baked dough panels are shown in FIG. 2 and are identified correspondingly to the molds, 16a, 18a, 20a, 22a, 24a. This figure also includes knockouts 27 formed by the inserts 26, as referred to again hereinbelow.

The roof mold 16 is preferably made up of two parts 32, 34 hinged together at a center line by a piano hinge or continuous hinge 36 suitably made by cutting notches in the adjacent border edges of the pieces, forming tongues 38 (FIG. 4) which are then bent to loop form, and a rod 40 inserted therethrough to complete the-hinge. The roof mold is laid flat as shown in FIG. 1 and the dough poured therein when it is in such position. Thereafter, it is angled to gable position and held in that position by hasps 42 at the ends of the gable pivoted at 44 on one of the mold pieces and having notches 46 for receiving pins 48 on the other piece.

In the case of the roof mold 16, the rim 30 at the ends of the gable is tapered from a high portion 50 adjacent the ridge line down to a lower portion 52 at the eaves. Due to the fluency of the dough in unbaked condition, and its tendency to run, the dough is poured thicker at the ridge portion, and confined in place by the higher rim 50 at that point, and thinner at the eave edges. Then when the roof mold is angled to gable position shown in FIG. 5, there remains at the ridge sufficient quantity or thickness or dough for forming the roof at that position of a thickness similar to the remainder, notwithstanding the tendency of the dough to run, resulting in a roof panel of more or less uniform thickness.

The pin 40 in the hinge is preferably not confined at either end, but easily removable for facility in cleaning the parts.

Each insert or cookie cutter 26, one of which is shown in FIGS. 7 and 8, includes a surrounding downturned edge or skirt 54 and a top element 56 surrounding a central hole 58. The inserts are pressed down into the dough in the various molds according to where it is desired to have openings, in the finished house, as windows and doors. As represented in FIG. 7, the insert 26 is fitted down into the position indicated by the dot-dash line 60, being pressed into the dough and cutting it. The skirt 54 forms a cutting edge entirely around the perimeter of the insert, cutting the dough, and after the dough is baked, the panel thus formed is lifted out of the mold, and the insert 26 is removed from the panel. This removal of the insert may carry the dough that is within it, or the insert may come out without pulling out the surrounded piece. If the piece is left in the baked panel, it can easily be knocked out, and this forms a separate piece or knockout 27 in FIG. 2 identified above.

The inserts 26 are placed at the desired positions in the molds to provide openings of corresponding position and size in the panels that are baked, such as windows 64, a door 66, etc. The windows would be elevated from the bottom edge, but the door 66 is shown opening through the edge 67 of the panel 20a to form a door. Certain of the knockouts 27 are used in forming the chimney of the house, as referred to hereinbelow.

Referring to FIG. 8 where an insert 26 is in place in the dough, the opening 58 in the top of the insert provides for escape of the gases from the dough within the insert in the baking step, to enable proper baking thereof. FIG. 8 shows the dough in unbaked form at 64, this dough rising to a level indicated at 66. The quantity of dough, or the thickness of the baked panels, is not of importance, and may be of any dimensions desired within a wide range. The panels are baked to a very rigid condition and are self supporting, the wall panels remaining upright, and the roof panel being self supporting throughout its horizontal shape, when put in place in the construction of the house. The thickness, or mass of the dough, may also be determined at least in part according to the edibility thereof, considering that children may wish to eventually eat the material making up the house.

While the roof mold 16 is preferably of the construction shown in FIGS. 3 and 4, it is also within the scope of the invention to make the roof mold as shown in FIG. 5. In this case the mold is made rigid, and preshaped to the angular shape representing the gable, and reinforced by fixed gussets or end pieces 72. The parts of this mold are identified with the same reference numerals as in the previous form, with prime indications. Notwithstanding the tendency of unbaked dough to run, the form of FIG. 5 would retain at least a substantial portion of the dough at the peak to form the ridge of the roof.

The end wall molds 22, 24 are formed with pointed ends 74 to form correspondingly pointed end panels 22a, 24a (FIG. 2) for cooperating with the gable shape of the roof, these molds at those points being shaped complementally to the angle of the roof mold.

After the panels are thus formed, they are fitted together as represented in FIG. 9, this figure showing the side wall panels 18, 20 transversely opposed to each other, and the end wall panels 22, 24 opposed in the other direction, spaced around an area 76 indicated by dot-dash lines, where the completed house is to be positioned. The roof panel 16a is shown spaced above the other panels, while the kockouts 27 are also shown in spaced relation above the roof panel.

In fitting the panels together to construct the house, two corner-joined panels such as 18a, 24a are first fitted into position with the edges butting, or nearly so, as in FIG. 11, and an icing material 78 is put into the seam, as in a caulking operation, the icing being applied in a suitable manner, such as by the finger, or a knife, and is applied wherever necessary, preferably on both the inside at 78a and the outside at 78b, and in sufficient quantity to secure the panels together. This step is repeated at all of the junctures between adjacent panels, i.e., adjacent wall panels, and the wall panel and roof panel. The icing is of course in mastic form and may be applied in any desired quantity, as a minimum for forming the necessary holding force for the panels, plus whatever additional is desired for appearance purposes. The step is repeated with the roof panel, and in this case icing may be applied to the upper edges of the wall panels as indicated at 78c in FIG. 12, before the roof panel is applied, and then the roof panel is put down, and thereafter additional icing may be applied as at 78d in FIG. 13 for holding effect, as well as appearance. It may also be applied, for appearance only, on the windows and door, as shown in FIG. 10.

The knockouts 27 in forming the chimney, are placed on the roof panel either before or after the roof panel is applied in the house construction. These knockouts are placed in rectangular arrangement to form a similarly shaped chimney and secured together by icing at 78e in FIG. 10, and the finalized chimney itself being secured to the roof panel by icing at 78f in that figure. The inserts 26 may be pre-dimensioned for forming longer knockouts 27a for positioning lower on the roof, and shorter ones 27b spaced apart along the ridge line, these engaging the ridge itself. The knockouts are shown in spaced apart position in FIG. 9 around an area indicated by the dot-dash line 80, at which they are placed to form the chimney.

What is claimed is:

1. Apparatus for making a gingerbread house comprising, a group of individual molds each including a bottom element and a surrounding upturned rim, the molds being adapted to have dough placed therein, and themselves with the dough therein to be placed in an oven for baking the dough, the dough thus baked forming panels in the respective molds, and the molds being so relatively dimensioned and proportioned that the panels are consequently correspondingly dimensioned and proportioned to form respective bounding surfaces of a house, the molds including one for each of such bounding surfaces, the panels being capable of being fitted together to form such house, one of the molds being a roof mold, and including a pair of rigidly connected parts disposed at an angle to each other corresponding to a gable and the upturned rim being deeper at the ridge of the gable and diminishing toward the edges remote from the ridge, a plurality of cookie cutters each having a surrounding skirt with a lower cutting edge and surrounding an open space, and each cookie cutter having a generally open top, the cookie cutters being capable of being inserted into the dough so placed in the molds with the cutting edges penetrating thereinto and therethrough to the bottom element of the mold, and enabling baking of those portions of the dough within the cookie cutters, and upon removal of the cookie cutters pursuant to baking, the pieces formed by the dough within the cookie cutters are capable of being removed by the removal of the cookie cutters, leaving holes in the panels formed by the molds, the holes forming windows and doors in the house, the cookie cutters being separate and apart from the molds and independent in number thereof from the molds, whereby they can be placed at any selected locations within the outline confines of the molds, and form windows and doors in correspondingly selected locations in the bounding surfaces of the house, the pieces formed in the cookie cutters being of such size as to form chimney construction.

2. Apparatus according to claim 1 wherein, two of said molds are end wall molds, each having a pair of adjoining peripheral elements disposed at substantially the same angle as that formed by the said hinged parts of the roof mold when those parts are in said angular position, whereby to form wall panels in the end wall molds having angularly shaped top surfaces corresponding to the angle formed by the roof panel and adapted to be complementally butted thereto.

3. Apparatus for making a gingerbread house comprising, a group of individual molds each including a bottom element and a surrounding upturned rim, the molds being adapted to have dough placed therein, and themselves with the dough therein to be placed in an oven for baking the dough, the dough thus baked forming panels in the respective molds, and the molds being so relatively dimensioned and proportioned that the panels are consequently correspondingly dimensioned and proportioned to form respective bounding surfaces of a house, the molds including one for each of such bounding surfaces, the panels being capable of being fitted together to form such house, one of said molds constituting a roof mold, and including a pair of parts hinged together at a midline, enabling the parts to lie in a common plane, and to assume an angular position representing a gable, and the roof mold including a releasable hasp to secure the parts in said angular position, a plurality of cookie cutters each having a surrounding skirt with a lower cutting edge and surrounding an open space, and each cookie cutter having a generally open top, the cookie cutters being capable of being inserted into the dough so placed in the molds with the cutting edges penetrating thereinto and therethrough to the bottom element of the mold, and enabling baking of those portions of the dough within the cookie cutters, and upon removal of the cookie cutters pursuant to baking, the pieces formed by the dough within the cookie cutters are capable of being removed by the removal of the cookie cutters, leaving holes in the panels formed by the molds, the holes forming windows and doors in the house, the cookie cutters being separate and apart from the molds and independent in number thereof from the molds, whereby they can be placed at any selected locations within the outline confines of the molds, and form windows and doors in correspondingly selected locations in the bounding surfaces of the house, the pieces formed in the cookie cutters being of such size as to form chimney construction.

* * * * *